United States Patent [19]

Ingram

[11] 4,035,315

[45] July 12, 1977

[54] FIRE-RESISTANT STYRENE POLYMER FOAMS

[75] Inventor: Alvin R. Ingram, Murrysville, Pa.

[73] Assignee: ARCO Polymers, Inc., Philadelphia, Pa.

[21] Appl. No.: 682,700

[22] Filed: May 3, 1976

[51] Int. Cl.² .......................................... C08J 9/22
[52] U.S. Cl. ...................... 260/2.5 B; 260/2.5 FP;
260/DIG. 24; 428/306; 428/314; 428/920
[58] Field of Search .................. 260/2.5 B, 2.5 FP;
252/8.1

[56] References Cited

U.S. PATENT DOCUMENTS

| | | | |
|---|---|---|---|
| 2,650,206 | 8/1953 | Stock | 260/2.5 FP |
| 2,894,918 | 7/1959 | Killoran et al. | 260/2.5 FP |
| 2,912,392 | 11/1959 | Stilbert et al. | 260/2.5 FP |
| 3,590,014 | 6/1971 | Burt | 260/2.5 FP |
| 3,654,190 | 4/1972 | Levine | 260/2.5 FP |

*Primary Examiner*—Morton Foelak
*Attorney, Agent, or Firm*—Lewis J. Young

[57] ABSTRACT

Fire-resistant foams having 1.2 to 2.5 pound per cubic foot density are prepared by coating 100 parts by weight of styrene polymer foam particles with at least 67 parts by weight of an intumescent paint and molding said coated prepuff into the desired end product foam.

2 Claims, No Drawings

FIRE-RESISTANT STYRENE POLYMER FOAMS

BACKGOURND OF THE INVENTION

This invention relates to styrene polymer foams formed by molding expandable styrene polymer beads coated with an intumescent paint. It is known that a substrate may be protected from heat and fire by the application of an intumescent composition. Thus, U.S. Pat. No. 2,755,260 teaches to coat fiberboard building material with intumescent paint.

Polymer foams are highly desirable in building construction because of their light weight and good heat insulating property. A prerequisite for use in the construction industry is that the foam must have reduced flammability. Many halogenated organic compounds have been proposed as additives for the purpose of reducing the flammability of the foams.

The addition of halogenated organic compounds to foamed styrene polymers, however, gives at best a slow-burning of self-extinguishing composition. Once ignited, these compositions burn giving off a black soot and flaming drips can occur. There is a need for a method for rendering foamed styrene polymer more resistant to ignition by flame and to help reduce the amount of smoke and flaming dripping.

SUMMARY OF INVENTION

It has now been found that compositions resistant to fire are produced by coating an intumescent paint onto the individual particles of styrene polymer between the steps of pre-expansion and of molding the particles into fused, molded shapes. The product is not only a coated article, but is an article having each particle within the article coated with an intumescent composition.

DETAILED DESCRIPTION OF THE INVENTION

In accordance with the invention, a variety of expandable thermoplastic homopolymers and copolymers can be made to have reduced flammability. The polymers may be derived from vinyl aromatic monomers, such as styrene, vinyltoluene, isopropylstyrene, alpha-methylstyrene, chlorostyrenes, tert-butylstyrene, etc., as well as copolymers prepared by the copolymerization of at least 50 percent by weight of a vinyl aromatic monomer with monomers such as butadiene, alkyl methacrylates, alkyl acrylates, acrylonitrile and maleic anhydride. For the purpose of convenience, these polymers and copolymers are referred to herein as styrene polymers.

The styrene polymers can, of course, be produced by any of the known techniques, for example by suspension or mass polymerization, to obtain particles in the form of beads or pellets.

To render the polymer particles expandable, the blowing agent is incorporated into the particles, as for example in U.S. Pat. No. 2,983,692, by suspending the particles in water with the aid of suspending agent systems such as tricalcium phosphate in combination with an anionic surfactant.

The blowing agents are compounds which are gases or which will produce gases on heating. Suitable agents include aliphatic hydrocarbons containing from 4–7 carbon atoms in the molecule, such as butane, pentane, cyclopentane, hexane, heptane, cyclohexane, and the hologenated hydrocarbons which boil at a temperature below the softening point of the polymer. Mixture of these agents may also be used, such as a 50/50 mixture of isopentane/n-pentane, or a 55/45 mixture trichlorofluoromethane/n-pentane. Usually from 4 to 20 percent of blowing agent per 100 part of polymer is incorporated by the impregnation.

The impregnation is conventionally carried out at temperatures ranging from about 60° to 150° C. Increasing the temperature makes the impregnation proceed at a faster rate.

After the impregnation is completed, the suspension of polymer particles is cooled to room temperatures to allow separation of the impregnated beads from the aqueous phase.

The formation of molded articles from expandable styrene polymer particles is effected in two steps: (1) pre-expanding of foamable styrene polymer particles to a density of between 0.7 and 2 pounds per cubic foot; and (2) further heating the pre-expanded particles in a closed mold to cause further expansion and form a fused, one-piece article having the shape of the mold. The second step is what is normally referred to as "molding".

The pre-expansion step may be carried out by heating the expandable polymer pellets by any suitable heating medium such as steam, hot air, hot water, or radiant heat. A method for continuous pre-expansion of the particles in steam at atmospheric pressure was disclosed in U.S. Pat. No. 3,023,175 by Rodman. A method for obtaining foam of lower density is that disclosed in U.S. Pat. No. 3,577,360 by Immel, which teaches the pre-expansion of polymer beads by heating in a dry atmosphere followed by the application of a vacuum.

In the present invention, the pre-expanded particles, called prepuff, are mixed or sprayed with an intumescent paint and dried to form coated particles. The paint solids comprise at least 40 percent by weight of the coated particles. These coated, prepuff particles are then placed into a mold cavity which defines the shape of the desired finished article. The particles are heated above their softening point, whereupon the particles expand further to fill the mold cavity. Upon drying, the particles are bonded together as a result of the inherent adhesive quality of the paint.

The intumescent paints are conveniently made up of 40 to 60 per cent aqueous dispersion of a mixture consisting of non-film forming intumescent solids and an aqueous, film-forming, latex-like dispersion of, for example, polystyrene, polyvinyl acetate, polyvinylidene chloride or nitrocellulose. The film-forming latex polymer is known as the binder and is generally used in 15 to 30 percent by weight of the total solids. The non-film forming intumescent solids are composed of carbon formers (carbonifics), carbonizing catalysts (spumifics), blowing agents, and minor amounts of various additives, such as pigments, surfactants, thickeners and the like.

The spumifics useful in this invention, in amounts of between 30 and 80 percent by weight of the non-film forming solids, are represented by monoammonium phosphate, ammonium polyphosphate, diammonium phosphate, phosphoric acid, ammonium sulfate, sulfamic acid, ammonium sulfamate, ammonium bromide, sodium tangstate and sodium borate.

The carbonifics, used in amounts of between 10 and 70 percent by weight of the spumific, may be carbohydrates, modified starches, gelatin, casein, or a polyhydric compound such as the hexitols, the pentitols, or the tetritols, such as pentaerythritol or dipentaerythritol. It is also possible to use a mixture of two or more of these carbonifics.

Blowing agents useful in the invention are substances such a melamine, methylolmelamine, and chlorinated paraffin hydrocarbon waxes. These agents are used in amounts of from 5 to 20 percent by weight of the spumifics.

Other additives, used in minor amount, i.e., less than 10 percent by weight based on non-film forming solids, may be various pigments, surfactants, thickeners and the like. The surfactants, usually introduced during the polymerization of the film-forming latex, may be the usual anionic surfactant, such as sodium dodecylbenzene-sulfonate. When the resulting latex polymer is not a good film-former, the use of a thickening agent is sometimes advantageous to enhance the film-forming characteristics. Such thickening agents are usually hydrophilic colloids, such as low viscosity methyl cellulose or sodium alginate.

A typical intumescent paint latex suitable for use in the present invention consists essentially of the following:

| Ingredient | %, by Weight | Purpose |
| --- | --- | --- |
| Water | 40.1 | Medium |
| Ammonium Polyphosphate | 24.0 | Carbonizing catalyst |
| Dipentaerythritol | 6.9 | Carbon former |
| Chlorinated paraffin | 11.1 | Blowing agent |
| Polyvinyl acetate | 11.2 | Binder |
| Titanium dioxide | 5.6 | Pigment |
| Surfactants, thickeners, etc. | 1.1 | Miscellaneous |
|  | 100.0 |  |

Such paints are readily available from commercial sources such as the Pittsburgh Plate Glass Company (e.g., Speedhide fire Retardant Latex Paint).

The coating may be applied to the expanded styrene polymer particles by any suitable method, such as stirring the particles into the paint or by spraying the particles with the paint or by, for example the method described in U.S. Pat. No. 3,462,293 where in the expanded beads are suspended in a stream of air at 100°–130° F., contacted with the aqueous latex, and dried in the heated air stream to form a uniform particulate coating.

The polymer particles may contain, prior to being coated, any of the usual additives, such as dyes, pigments, self-extinguishing agents, antistatic agents, plasticizers, or the like.

The invention is further illustrated, but not limited, by the following examples in which all parts and percentages are by weight.

EXAMPLE I

To 100 parts of polystyrene prepuff beads having a density of 1.0 pcf was added 400 parts of an intumescent latex paint consisting of 40.1% of water, 24.0% of ammonium polyphosphate, 7.0% of dipentaerythritol, 11.1% of paraffin hydrocarbon being 70% chlorinated, 11.2% of polyvinyl acetate, 5.6% titanium dioxide and 1.0% of added surfactants and thickening agents. The mixture was stirred with a wooden spatula until the paint appeared uniformly dispersed over the polymer bead surfaces. The beads were then allowed to air dry for 18 hours. The resultant beads had a foam density of about 2.2 pcf. They were not ignitable, but did shrink and crumble in the path of the flame. These foam particles were then placed in a conduction press, moistened, and pressed at 120°C. for one minute. The resulting air-dried foam had about 20% fusion, few voids, a density of 4.8 pcf and was non-ignitable.

EXAMPLE II

To 100 parts of polystyrene prepuff beads having a density of 1.0 pcf was added 133 parts of an intumescent paint consisting of 28.6% of water, 28.6% of ammonium polyphosphate, 8.2% of dipentaerythritol, 9.0% of melamine, and 25.6% of polyvinylidene chloride. The mixture was stirred to ensure complete coating of the beads with the paint and then dried. The coated prepuff was then molded in a compression mold using 20–25 psi steam and a back-pressure of 15–20 psi to give 8 inch diameter by 1 inch thick discs having a foam density of 2.2 pcf and a foam fusion of 65%. The dried foam moldings were difficult to ignite, extinguished immediately after removal of the external flame, and burned without smoke and no flaming drips while in the external flame.

EXAMPLE III

An intumescent latex paint (150 parts) such as that used in Example I was spray-coated onto 100 parts of polystyrene prepuff beads and the coated beads molded while still wet in a molding press at 120°C for 1.5 minutes into plaques 5½ inches × 5½ inches × ½ inches. The initial prepuff had a foam density of 1.0 pcf and the density of the dried plaque was 2.4 pcf. The plaques had very low internal fusion and attempts to ignite the plaque when supported vertically by a clamp resulted in disintegration of the sample. When supported on a horizontal screen, the plaques did not burn, smoke, or drip when exposed to flame from a propane torch from above or below.

I claim:

1. A fire-resistant, partially foamed styrene polymer composition consisting essentially of pre-expanded styrene polymer particles of foam density 1 pound per cubic foot or less and having on the surface thereof a coating of at least 40 percent by weight, based on the weight of the coated particles, of intumescent paint solids consisting essentially of 15 to 30 percent by weight of a polymeric film-forming binder, and 85 to 70 percent by weight of a non-resinous intumescent solids consisting essentially of 30 to 80 percent by weight based on nonresinous solids of a spumific, 10 to 70 percent by weight based on weight of spumific of a carbonific, 5 to 20 percent by weight based on weight of spumific of a blowing agent, and up to 10 percent by weight based on weight of non-resinous solids of additives such as pigments, surfactants, thickeners, and the like.

2. The composition of claim 1 wherein the binder is polyvinyl acetate, the carbonific is dipentaerythritol, the spumific is ammonium polyphosphate, the blowing agent is a paraffin hydrocarbon having 70% by weight chlorine, and an additive is titanium dioxide.

* * * * *